United States Patent
Luick

(10) Patent No.: US 7,454,654 B2
(45) Date of Patent: Nov. 18, 2008

(54) MULTIPLE PARALLEL PIPELINE PROCESSOR HAVING SELF-REPAIRING CAPABILITY

(75) Inventor: David A. Luick, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 127 days.

(21) Appl. No.: 11/531,387

(22) Filed: Sep. 13, 2006

(65) Prior Publication Data

US 2007/0011434 A1 Jan. 11, 2007

Related U.S. Application Data

(63) Continuation of application No. 10/667,097, filed on Sep. 18, 2003, now Pat. No. 7,124,318.

(51) Int. Cl.
*G06F 11/00* (2006.01)
(52) U.S. Cl. .......................... 714/10; 712/206
(58) Field of Classification Search ............... 714/10; 712/21, 22, 206, 221, 222
See application file for complete search history.

(56) References Cited

U.S. PATENT DOCUMENTS

| | | | |
|---|---|---|---|
| 5,333,296 A | 7/1994 | Bouchard et al. | |
| 5,598,546 A | 1/1997 | Blomgren | |
| 6,079,009 A * | 6/2000 | Wise et al. | 712/209 |
| 6,128,721 A | 10/2000 | Yung et al. | |
| 6,412,061 B1 | 6/2002 | Dye | |
| 6,513,092 B1 | 1/2003 | Gorshe | |
| 6,523,106 B1 | 2/2003 | Mroczek et al. | |
| 6,785,841 B2 | 8/2004 | Akrout et al. | |
| 7,240,184 B2 * | 7/2007 | Siu et al. | 712/221 |
| 7,325,158 B2 * | 1/2008 | Tillmanns | 714/11 |
| 7,328,371 B1 * | 2/2008 | Kalyanasundharam et al. | 714/11 |
| 2005/0066079 A1 | 3/2005 | Luick | |
| 2005/0188107 A1 | 8/2005 | Piercey et al. | |
| 2006/0101307 A1 | 5/2006 | Rapp et al. | |
| 2007/0074009 A1 * | 3/2007 | Donofrio et al. | 712/222 |
| 2008/0005534 A1 * | 1/2008 | Jourdan et al. | 712/206 |

FOREIGN PATENT DOCUMENTS

EP 0649085 A1 4/1995

* cited by examiner

*Primary Examiner*—Christopher S McCarthy
(74) *Attorney, Agent, or Firm*—Roy W. Truelson

(57) ABSTRACT

A multiple parallel pipeline digital processing apparatus has the capability to substitute a second pipeline for a first in the event that a failure is detected in the first pipeline. Preferably, a redundant pipeline is shared by multiple primary pipelines. Preferably, the pipelines are located physically adjacent one another in an array. A pipeline failure causes data to be shifted one position within the array of pipelines, to by-pass the failing pipeline, so that each pipeline has only two sources of data, a primary and an alternate. Preferably, selection logic controlling the selection between a primary and alternate source of pipeline data is integrated with other pipeline operand selection logic.

9 Claims, 8 Drawing Sheets

MULTIPLE PARALLEL PIPELINE PROCESSOR HAVING SELF-REPAIRING CAPABILITY

CROSS-REFERENCE TO RELATED APPLICATIONS

This is a continuation application of U.S. patent application Ser. No. 10/667,097, filed Sep. 18, 2003, entitled "Multiple Parallel Pipeline Processor Having Self-Repairing Capability", which is herein incorporated by reference.

The present application is also related to the following commonly assigned co-pending application, which is herein incorporated by reference: Ser. No. 10/667,084, filed Sep. 18, 2003, entitled "Multiple Processor Core Device Having Shareable Functional Units for Self-Repairing Capability".

FIELD OF THE INVENTION

The present invention relates to digital data processing hardware, and in particular to the design of high-performance processing units which have multiple parallel pipelines for concurrently processing data.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises a central processing unit (CPU) and supporting hardware necessary to store, retrieve and transfer information, such as communications buses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed of a computer system (also called the "throughput") maybe crudely measured as the number of operations performed per unit of time. Conceptually, the simplest of all possible improvements to system speed is to increase the clock speeds of the various components, and particularly the clock speed of the processor. E.g., if everything runs twice as fast but otherwise works in exactly the same manner, the system will perform a given task in half the time. Early computer processors, which were constructed from many discrete components, were susceptible to significant speed improvements by shrinking and combining components, eventually packaging the entire processor as an integrated circuit on a single chip. The reduced size made it possible to increase the clock speed of the processor, and accordingly increase system speed.

In addition to increasing clock speeds, it is possible to improve system throughput by using multiple copies of certain components, and in particular, by using multiple CPUs. The modest cost of individual processors packaged on integrated circuit chips has made this practical. While there are certainly potential benefits to using multiple processors, additional architectural issues are introduced. Without delving deeply into these, it can still be observed that there are many reasons to improve the speed of the individual CPU, whether or not a system uses multiple CPUs or a single CPU. If the CPU clock speed is given, it is possible to further increase the speed of the individual CPU, i.e., the number of operations executed per second, by increasing the average number of operations executed per clock cycle.

Most modern processor employ concepts of pipelining and parallelism to increase the clock speed and/or the average number of operations executed per clock cycle. Pipelined instruction execution allows subsequent instructions to begin execution before previously issued instructions have finished, so that execution of an instruction overlaps that of other instructions. Ideally, a new instruction begins with each clock cycle, and subsequently moves through a pipeline stage with each cycle. Because the work of executing a single instruction is broken up into smaller fragments, each executing in a single clock cycle, it may be possible to increase the clock speed. Even though an instruction may take multiple cycles or pipeline stages to complete, if the pipeline is always full, the processor executes one instruction every cycle.

Some modern high-performance processor designs, sometimes known as "superscalars", have extended the pipeline concept, to employ multiple parallel pipelines, each operating concurrently on separate data. Under ideal conditions, each instruction simultaneously causes data to be operated upon in each of the parallel pipelines, and thus there is a potential throughput multiplier equal to the number of pipelines, although in reality this is only a theoretical limit, it being impossible to keep all pipelines full at all times.

In one variation of a parallel pipeline design, known as "Single Instruction, Multiple Data" (SIMD), each instruction contains a single operation code applicable to each of a set of parallel pipelines. While each pipeline performs operations on separate data, the operations performed are not independent. Generally, each pipeline performs the same operation, although it may be possible that some instruction op codes dictate that specific pipelines perform different specific operations.

In another variation of a parallel pipeline design, known as "Multiple Instruction, Multiple Data" (MIMD), each instruction contains separate and independent operation codes for each respective pipeline, each set applicable to a different respective pipeline. When compared with a SIMD design, the MIMD design permits greater flexibility during execution and generally higher utilization of the pipelines, because each pipeline can perform independent operations. However, the need to specify different operations for each pipeline in the instruction substantially increases the length of the instruction, and increases the complexity of the hardware necessary to support an MIMD design. As a result of these countervailing considerations, in can not be said that either of these two approaches is clearly superior to the other, although SIMD designs appear to be more widely used at the present time.

A multiple parallel pipeline processor, whether employing a SIMD or MIMD design, is an enormously complex device. The multiple pipelines require relatively large integrated circuit chip area of primarily custom logic. These circuits within these pipelines have a high degree of switching activity, and consume considerable power at the operating frequencies typical of such devices. The power density, i.e., the amount of power consumed per unit area of chip surface, tends to be significantly greater within the pipelines than in many other areas of the processor chip, such as cache arrays and registers. This high level of activity and high power consumption makes the multiple pipeline area of the processor chip particularly susceptible to failure.

In a conventional multiple parallel pipeline processor, the failure of any part of a pipeline (even though the failure affects only a single pipeline) generally means that the processor is no longer able to process the instructions, since the instructions assume that all operands will simultaneously be processed by their respective pipelines. Therefore, the entire processor is effectively disabled. This may in turn cause system failure, although in some multiple-processor computer systems, the system can continue to operate, albeit at a reduced throughput, using the remaining functioning processors.

In order to increase the success and acceptability of multiple-pipeline processor designs, it is desirable to reduce the frequency of processor failure, and in particular, the frequency of processor failure as a result of failure in some circuitry within the pipelines. A need exist for improved designs to counter the vulnerability of multiple pipeline processors.

SUMMARY OF THE INVENTION

A multiple parallel pipeline digital processing apparatus has the capability to substitute a second pipeline for a first in the event that a failure is detected in the first pipeline. Preferably, a redundant pipeline is shared by multiple primary pipelines, and in the event that any primary pipeline fails, the redundant pipeline assumes the failing pipeline's function.

In one aspect of the preferred embodiment, multiple primary pipelines and a single redundant pipeline are located physically adjacent one another in an array, each pipeline (except the two at the edges) having two neighboring pipelines, one on either side. A pipeline failure causes data to be shifted one position within the array of pipelines, to by-pass the failing pipeline. The shift is always one position, to maintain close physical proximity with the normal source registers for the data. Thus, if the first pipeline in the array fails and the fifth pipeline redundant, data intended for the first pipeline is shifted to the second pipeline, data intended for the second is shifted to the third, and so forth.

In another aspect of the preferred embodiment, selection logic controlling the selection between a primary source and a secondary source of pipeline data is integrated with other selection logic, specifically operand source selection logic for various phases of the pipeline. This operand source selection logic is used for by-passing of certain pipeline logic or registers. Because the selection between a primary and secondary source is integrated with other selection logic, no or minimal additional logic gates are introduced in the data path of pipelined data, which is often a critical timing path.

In another aspect of the preferred embodiment, a single redundant pipeline is shared by multiple (preferably two) primary pipeline sets for respective processor cores located on a single integrated circuit chip. In this case, the redundant pipeline is physically located between the two primary pipeline sets and adjacent both sets.

A redundant pipeline constructed in accordance with the preferred embodiment of the present invention has the capability to keep a processor up and running in the event of failure of a component part of a single pipeline in a multiple pipelined processor. Moreover, due to the configuration of pipelines and selection circuitry according to the preferred embodiment, virtually no additional delay is introduced into any critical timing path. The additional pipeline consumes some chip area, but it is not necessary to duplicate the entire processor.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
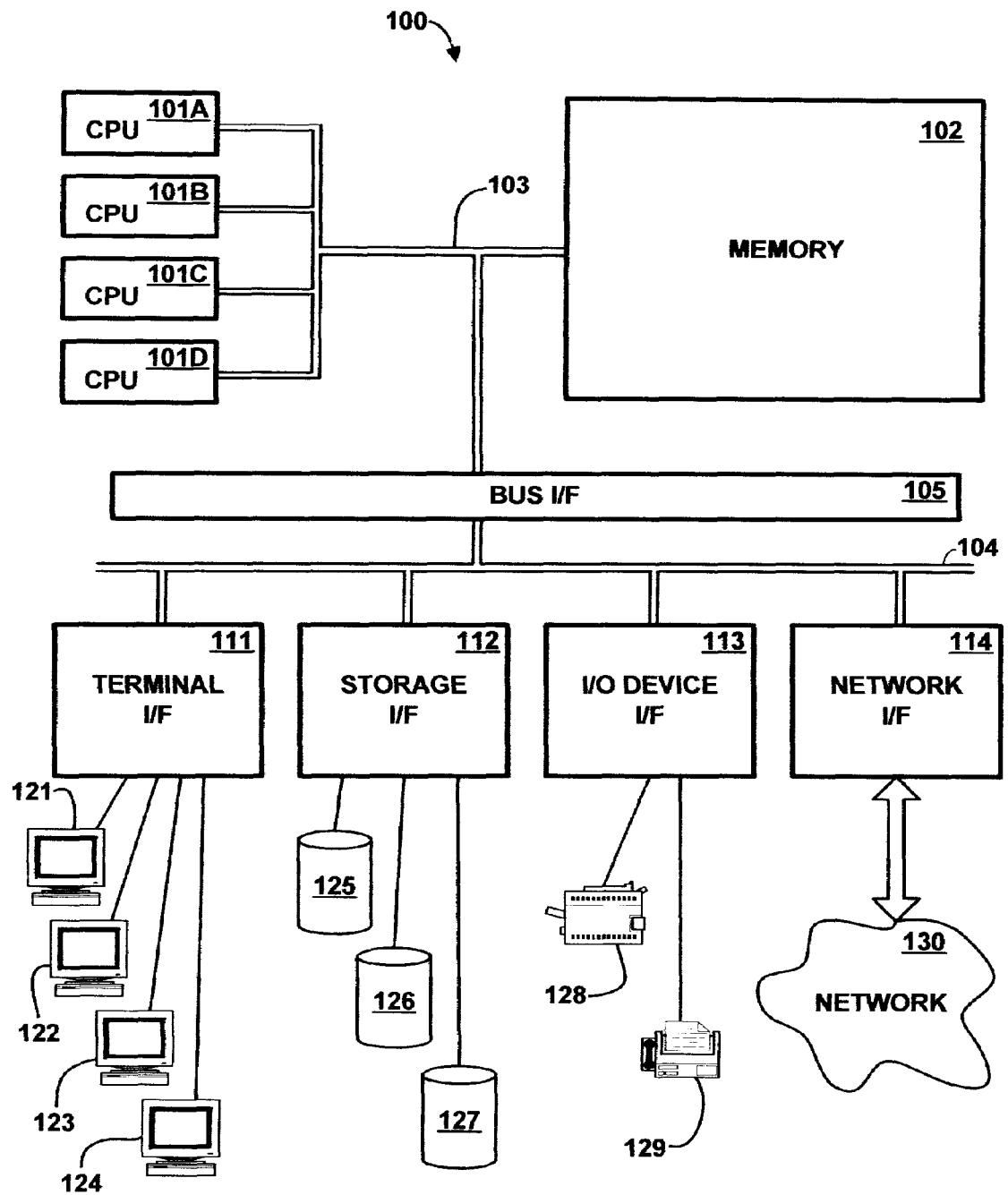
FIG. 1 is a high-level block diagram of the major hardware components of a computer system utilizing a multiple parallel pipeline processor, according to the preferred embodiment of the present invention.

Referring to the Drawing, wherein like numbers denote like parts throughout the several views, FIG. 1 is a high-level representation of the major hardware components of a computer system 100 utilizing a multiple parallel pipeline processor, according to the preferred embodiment of the present invention. The major components of computer system 100 include one or more central processing units (CPU) 101, main memory 102, terminal interface 111, storage interface 112, I/O device interface 113, and communications/network interfaces 114, all of which are coupled for inter-component communication via buses 103, 104 and bus interface 105.

System 100 contains one or more general-purpose programmable central processing units (CPUs) 101A-101D, herein generically referred to as feature 101. In the preferred embodiment, system 100 contains multiple processors typical of a relatively large system; however, system 100 could alternatively be a single CPU system. Each processor 101 executes instruction stored in memory 102, and may include one or more levels of on-board cache. Memory 102 is a random-access semiconductor memory for storing data and programs. Memory 102 is conceptually a single monolithic entity, it being understood that memory is often a more complex arrangement, such as a hierarchy of caches and other memory devices.

Memory bus 103 provides a data communication path for transferring data among CPUs 101, main memory 102 and I/O bus interface unit 105. I/O bus interface 105 is further coupled to system I/O bus 104 for transferring data to and from various I/O units. I/O bus interface 105 communicates with multiple I/O interface units 111-114, which are also known as I/O processors (IOPs) or I/O adapters (IOAs), through system I/O bus 104. System I/O bus may be, e.g., an industry standard PCI bus, or any other appropriate bus technology. The I/O interface units support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O and other device interface 113 provides an interface to any of various other input/output devices or devices of other types. Two such devices, printer 128 and fax machine 129, are shown in the exemplary embodiment of FIG. 1, it being understood that many other such devices may exist, which may be of differing types. Network interface 114 provides one or more communications paths from system 100 to other digital devices and computer systems; such paths may include, e.g., one or more networks 130 such as the Internet, local area networks, or other networks, or may include remote device communication lines, wireless connections, and so forth.

It should be understood that FIG. 1 is intended to depict the representative major components of system 100 at a high level, that individual components may have greater complexity that represented in FIG. 1, that components other than or in addition to those shown in FIG. 1 may be present, and that the number, type and configuration of such components may vary. Several particular examples of such additional complexity or additional variations are disclosed herein, it being understood that these are by way of example only and are not necessarily the only such variations.

Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although memory bus 103 is shown in FIG. 1 as a relatively simple, single bus structure providing a direct communication path among CPUs 101, main memory 102 and I/O bus interface 105, in fact memory bus 103 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 104 are shown as single respective units, system 100 may in fact contain multiple I/O bus interface units 105 and/or multiple I/O buses 104. While multiple I/O interface units are shown which separate a system I/O bus 104 from various communications paths running to the various I/O devices, it would alternatively be possible to connect some or all of the I/O devices directly to one or more system I/O buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. Computer system 100 may alternatively be a single-user system, typically containing only a single user display and keyboard input, or might be a server or similar device which has little or no direct user interface, but receives requests from other computer systems (clients).

While various system components have been described and shown at a high level, it should be understood that a typical computer system contains many other components not shown, which are not essential to an understanding of the present invention.

Figure 2:
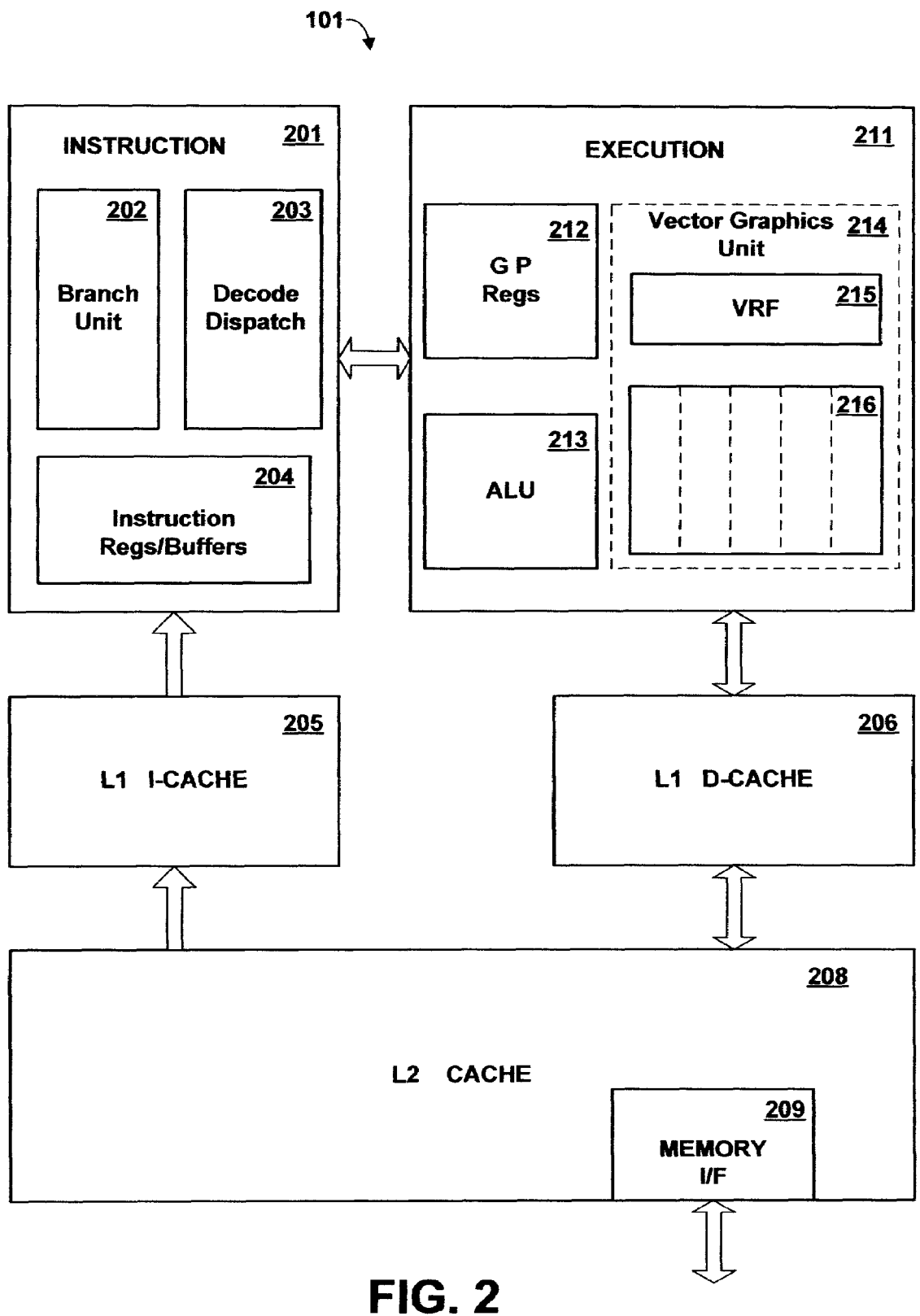
FIG. 2 is a high-level diagram of the major components of a CPU having parallel pipelines, according to the preferred embodiment.

FIG. 2 is a high-level diagram of the major components of CPU 101 according to the preferred embodiment, showing CPU 101 in greater detail than is depicted in FIG. 1. In this embodiment, the components shown in FIG. 2 are packaged in a single semiconductor chip. CPU 101 includes instruction unit portion 201, execution unit portion 211, Level 1 Instruction Cache (L1 I-Cache) 205, Level 1 Data Cache (L1 D-Cache) 206, Level 2 Cache (L2 Cache) 208, and memory interface 209. In general, instruction unit 201 obtains instructions from L1 I-cache 205, decodes instructions to determine operations to perform, and resolves branch conditions to control program flow. Execution unit 211 performs arithmetic and logical operations on data in registers, and loads or stores data from L1 D-Cache. L2 Cache 208 is a level 2 cache, generally larger that L1 I-Cache or L1 D-Cache providing data to L1 I-Cache 205 and L1 D-Cache 206. L2 Cache 208 is coupled to external memory interface 209, which loads data from or stores it to an external memory location, which is generally main memory 102, although it could be another level of cache.

Instruction unit 201 comprises branch unit 202, instruction decode/dispatch unit 203, and instruction registers and buffers 204. Instructions from L1 I-cache 205 are loaded into buffers 204 prior to execution. Depending on the CPU design, there may be multiple buffers (e.g., one for a sequential series of instructions, and others for branch-to locations), each of which may contain multiple instructions. Decode/dispatch unit 203 receives the current instruction to be executed from one of the buffers, and decodes the instruction to determine the operation(s) to be performed or branch conditions. Branch unit 202 controls the program flow by evaluating branch conditions, and refills buffers from L1 I-cache 205.

L1 I-cache 205 and L1 D-cache 206 are separate instruction and data caches providing data to instruction and execution units. L2 cache is a non-discriminated cache containing both instructions and non-instruction data. Typically, data is taken from or stored to an L1 cache by the instruction or execution unit, and if the data is unavailable in an L1 cache, it is loaded into the L1 cache from L2 cache 208, which in turn obtains it from main memory 102, and then transferred from L1 cache to the corresponding unit. Depending on the processor design, it may be possible to by-pass L1 cache and load data from L2 cache 208 to an execution or instruction register. Memory bus interface 209 handles the transfer of data across memory bus 103, which may be to main memory or to I/O units via bus interface 105.

Execution unit 211 comprises a set of general purpose registers 212 for storing data and an integer arithmetic logic unit 213 for performing arithmetic and logical operations on data in GP registers 212 responsive to instructions decoded by instruction unit 201. Execution unit further includes vector/graphics subunit 214 for performing mathematically intensive operations. Vector/graphics unit 214 includes a set of vector registers 215, and a set of parallel arithmetic/logic pipelines 216 for operating on data in vector registers 215. Vector/graphics unit 214 and its components are described in greater detail herein. Although referred to herein as a vector/graphics unit, this is merely descriptive of typical usage. In fact, unit 214 simply performs mathematical operations on data, and can be used for any or various applications requiring mathematically intensive operations. In addition to components shown in FIG. 2, execution unit may include additional special purpose registers and counters, load and store hardware for fetching data from or storing it to cache or memory, control hardware, and so forth. In particular, execution unit 211 may include additional pipelines (not shown) separate from the set of parallel pipelines 216 in vector/graphics unit 214. For example, integer ALU 213 may be implemented as one or more pipelines; execution unit 211 may contain one or more load/store pipelines for transferring data between GP registers 212 or vector registers 215 on the one hand and some form of memory (generally L1 D-Cache or L2 Cache) on the other. Additional pipelines, such as an instruction fetch and decode pipeline, may exist within processor 101.

While various CPU components have been described and shown at a high level, it should be understood that the CPU of the preferred embodiment contains many other components not shown, which are not essential to an understanding of the present invention. For example, various additional special purpose registers will be required in a typical design. Furthermore, it will be understood that the CPU of FIG. 2 is simply one example of a CPU architecture, and that many variations could exist in the number, type and arrangement of components within CPU 101, that components not shown may exist in addition to those depicted, and that not all components depicted might be present in a CPU design. For example, the number and configuration of buffers and caches may vary; the number and function of execution unit pipelines may vary; registers may be configured in different arrays and sets; dedicated floating point hardware may or may not be present; etc.

In the preferred embodiment, processor 101 is a Single Instruction, Multiple Data (SIMD) processor. Each instruction decoded by instruction unit 201 contains a single operation code specifying an operation, and potentially multiple operand specifiers. In the preferred embodiment, the processor contains a vector/graphics subunit 214 having four primary arithmetic/logic pipelines (and one additional arithmetic/logic pipeline used as a spare), it being understood that the number of such pipelines could vary. Accordingly, a subset of the instruction set for processor 101 includes instructions which are executed by the pipelines 216 within the vector/graphics subunit. Each instruction for pipelines 216 contains a single operation code applicable to all pipelines. Each instruction further specifies the sources and destinations of data in vector registers 215. In the preferred embodiment, an instruction may contain as many as three operand source specifiers and a single destination specifier, which refer to registers in vector register set 215. In the preferred embodiment, every pipeline of set 216 performs the same operations as each of the other pipelines in any given cycle (except for any idled pipeline). It would alternatively be possible to design operation codes which are used to specify a fixed, pre-defined set of operations for the pipelines corresponding to their respective positions, where not all of the operations are the same.

Processor 101 could alternatively be a Multiple Instruction, Multiple Data (MIMD) processor, also known as a Very Long Instruction Word (VLIW) or Wide Issue Superscalar, in which the instruction contains multiple independent operation codes, each corresponding to a respective pipeline.

In accordance with the preferred embodiment, a set of parallel arithmetic/logic pipelines includes one additional redundant pipeline. In the event that any of the primary pipelines becomes inoperable (fails), switching logic engages the redundant pipeline to provide the function of the failing primary pipeline.

Figure 3:
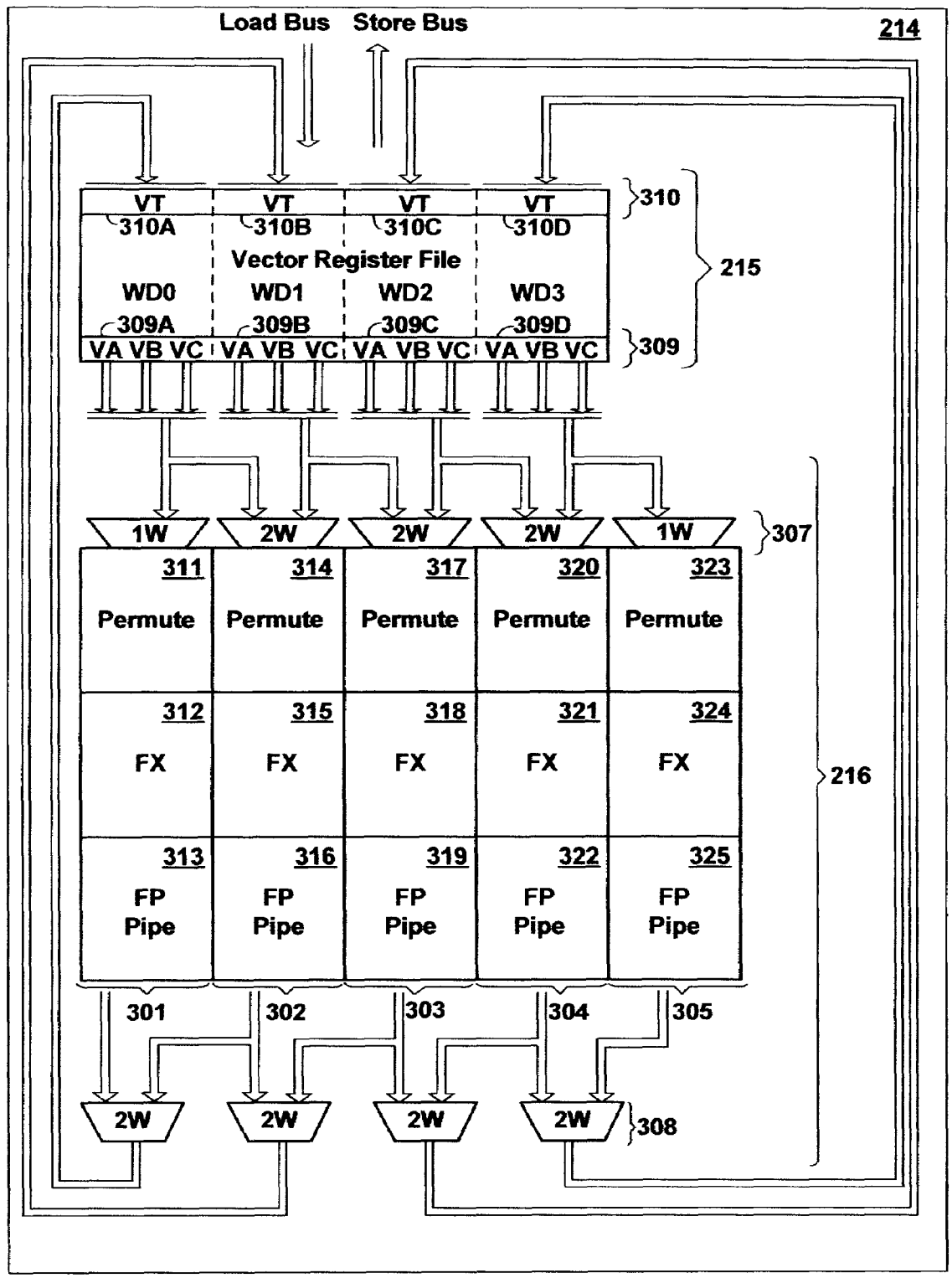
FIG. 3 is a high-level conceptual view of a parallel pipelined subunit within the CPU, according to the preferred embodiment.

FIG. 3 is a high-level conceptual view of the vector graphics unit 214 within execution unit 211, and in particular, the set of parallel arithmetic/logic pipelines and switching logic 216, according to the preferred embodiment. Referring to FIG. 3, parallel pipeline set 216 includes five pipelines 301-305 which are designated Pipe0 through Pipe4, respectively. Preferably, each of the five pipelines is identical to the others, although redundant function would still be possible in the presence of some differences among the pipelines. Each pipeline comprises respective three sections: a respective permute section 311, 314, 317, 320, 323; a respective fixed multiply/add (FX) section 312, 315, 318, 321, 324; and a respective floating point (FP) section 313, 316, 319, 322, 325. Pipe0 through Pipe3 301-304 are the primary pipelines, while Pipe4 305 is the spare, or redundant, pipeline.

Permute sections 311, 314, 317, 320, 323 perform shift, rotate, insert and similar operations on data. A permute section typically requires 3-4 execution clock cycles (stages). FX sections 312, 315, 318, 321, 324 perform fixed-point addition, subtraction, multiplication, division and comparison. A FX section typically requires 4-8 execution cycles. FP sections 313, 316, 319, 322, 325 perform floating point addition and multiplication. A FP section typically requires approximately 12 execution cycles.

Each pipeline section is essentially a complete pipeline, i.e., it is capable of receiving multiple input operands from vector registers 215 and producing an output to vector registers 215. However, only one set of input and output registers exist for the pipeline, which are shared by all sections. I.e., one set of input registers for Pipe0 301 is shared by permute section 311, FX section 312 and FP section 313.

Vector register file 215 is a bank of registers providing the data upon which pipelines 301-305 operate. In the preferred embodiment, register file 215 contains 128 general registers capable of being designated as operands of a vector/graphics instruction. Each general register is divisible into four 32-bit words, each word corresponding to a different respective pipeline of pipeline set 216. Each of the 32-bit words within a register can be loaded with independent data. When the register is a designated operand in a pipeline instruction, each of the four 32-bit words of the register simultaneously provides source data to or receives destination data from its respective pipeline of pipeline set 216. A vector/graphics instruction decoded for execution by vector/graphics unit 214 may specify any of the 128 general registers in register file 215 as a source or destination operand for a pipeline operation.

From the point of view of the programmer, compiler, or instruction set, vector register file 215 simply contains 128 registers, any of which may serve as a source or destination operand. However, in physical construction, register file 215 also contains four sets of temporary registers, one associated with each respective pipeline, which are transparent to the programmer, compiler or instruction set. Each set of temporary registers contains four registers, designated VA, VB, VC and VT. Temporary input registers VA, VB and VC 309A-309D (generally designated 309) hold input data to the pipelines, while temporary result registers VT 310A-310D (generally designated 310) hold results. An instruction designating a register Vi as a source operand for input to pipeline 216 actually causes the data in Vi to be written to one of the temporary input registers in input register set 309, such as VA, from which it is input to the pipeline. Similarly, the output of the pipeline is always written into a temporary register VT 310, from which it is transferred to a destination register designated in the instruction. This physical construction facilitates transfer of data from multiple sources to multiple possible targets. I.e., there are multiple data entry points to each pipeline, and multiple data exit points from each pipeline. The creation of a direct path from each possible source register to each possible entry point in a pipeline, or the creation of a direct path from each possible exit point to each possible destination register, may involve excessive hardware or excessive time to complete a cycle.

Pipelines 301-305 are preferably constructed in physical proximity in a regular array, approximately as shown in FIG. 3. Each set of temporary input registers 309 is physically positioned near a respective primary pipeline. Each set of temporary input registers fans out to provide input to two pipelines, being the primary pipeline with which it is associated, and the pipeline adjacent the primary pipeline and next highest in the designated pipeline order. I.e., the set of temporary registers 309A associated with primary pipeline Pipe0 301 also provides input to Pipe1 302; the set of temporary registers 309B associated with Pipe1 302 also provides input to Pipe2 303, and so on. Selection logic 307 at the inputs to each pipeline determines whether to select the temporary input registers associated with that pipeline, or an alternate set of temporary registers associated with an adjacent pipeline. In the case of pipelines 301 and 305 at the edges of the pipeline array, only one set of source registers can be selected.

Similarly, the output of each pipeline 302-305 fans out to two temporary result registers 310. Pipelines 301 and 305, and the edges of the array, have only a single destination. Selection logic 308 determines whether to select the output of the pipeline associated with a result register, or the output of an alternative adjacent pipeline, for input to the result register. For example, temporary result register 310D associated with primary pipeline 304 can also receive results from redundant pipeline 305.

In normal operation, pipelines 301-304 receive data from input registers 309A-309D, respectively, and output their results to result registers 310A-310D, respectively, while pipeline 305 remains idle. In the event that a primary pipeline becomes inoperable, the inoperable pipeline is idled, and redundant pipeline 305 is engaged. Preferably, idling is performed by disabling the clock signal to the affected pipeline, which reduces power consumption in the idled pipeline.

When the redundant pipeline is engaged, pipeline inputs and outputs are shifted over a single pipeline in the array to utilize the redundant pipeline. For example, if pipeline 302 becomes inoperable, pipeline 302 is idled and redundant pipeline 305 is activated. The input registers 309B for pipeline 302 are selected by selection logic 307 to provide input to pipeline 303, the input registers 309C for pipeline 303 are selected by selection logic 307 to provide input to pipeline 304, and the input registers 309D for pipeline 304 are selected to provide input to redundant pipeline 305. In this case, pipeline 301 continues to receive its input from registers 309A. A similar shift is performed at the output. I.e., in this example, the output of pipeline 303 is selected by selection logic 308 to be stored in temporary result register 310B, the output of pipeline 304 is selected to result register 310C, and the output of pipeline 305 is selected to result register 310D. The output of pipeline 301 continues to be placed in result register 310A. Thus, pipeline 303 effectively assumes the function of inoperable pipeline 302, while the functions normally performed by pipeline 303 are shifted over to pipeline 304, and the functions normally performed by pipeline 304 are shifted over to redundant pipeline 305.

In the preferred embodiment, all of the instructions in the instruction set perform the same operation in all four pipelines, although different data is used. Therefore, the control logic does not need to account for the fact that input data has been shifted over as a result of one of the pipelines becoming inoperable. However, it would alternatively be possible to design a processor having a limited number of special instructions, which do not perform the identical function in all pipelines. In this case, additional control logic (not shown) would select the function performed by a particular pipeline based on the data currently assigned to it. I.e., if pipeline 302 becomes inoperable and pipeline 304 assumes the function normally performed by pipeline 303, then control logic would also provide shifted control signals so that pipeline 304 behaves exactly as pipeline 303 should. The same principle would apply if processor 101 were a MIMD machine, in which the instruction set specifies different operations for each of the multiple parallel pipelines.

While it would be theoretically possible to divert the data for the inoperable pipeline directly to the redundant pipeline (in the example above, divert data for pipeline 302 to pipeline 305), shifting over by one pipeline as described above in the preferred embodiment is believed to have certain advantages. By shifting inputs and outputs over only a single pipeline, the lengths of the physical paths between registers 309, 310 and their corresponding pipelines can be minimized. These data paths tend to be critical timing paths, and it is therefore important to minimize the length wherever possible. Additionally, any single pipeline has at most two alternative sets of input and output registers, avoiding relatively large selection input logic to the redundant pipeline. Finally, shifting by one promotes greater regularity in the circuit design, making it easier to alter the design to accommodate differing numbers of pipelines and different configuration options.

In FIG. 3, selection logic 307 is depicted as a bank of 2-way (or 1-way) selection logic circuits which select as input to a pipeline either the 32-bit word of a vector register corresponding to the pipeline, or the 32-bit word of the same register corresponding to an adjacent pipeline. Selection logic 308 for the output is shown similarly. While it would be possible to implement a redundant pipeline for a parallel pipeline array in this fashion, it would cause an additional logic delay to be interposed at the input, and an additional logic delay to be interposed at the output, of the pipeline. In the preferred embodiment, the selection logic for selecting between different sets of input register words is integrated with other selection logic, so that the critical path sees no additional selection logic delays at the input and output.

Figure 4A:
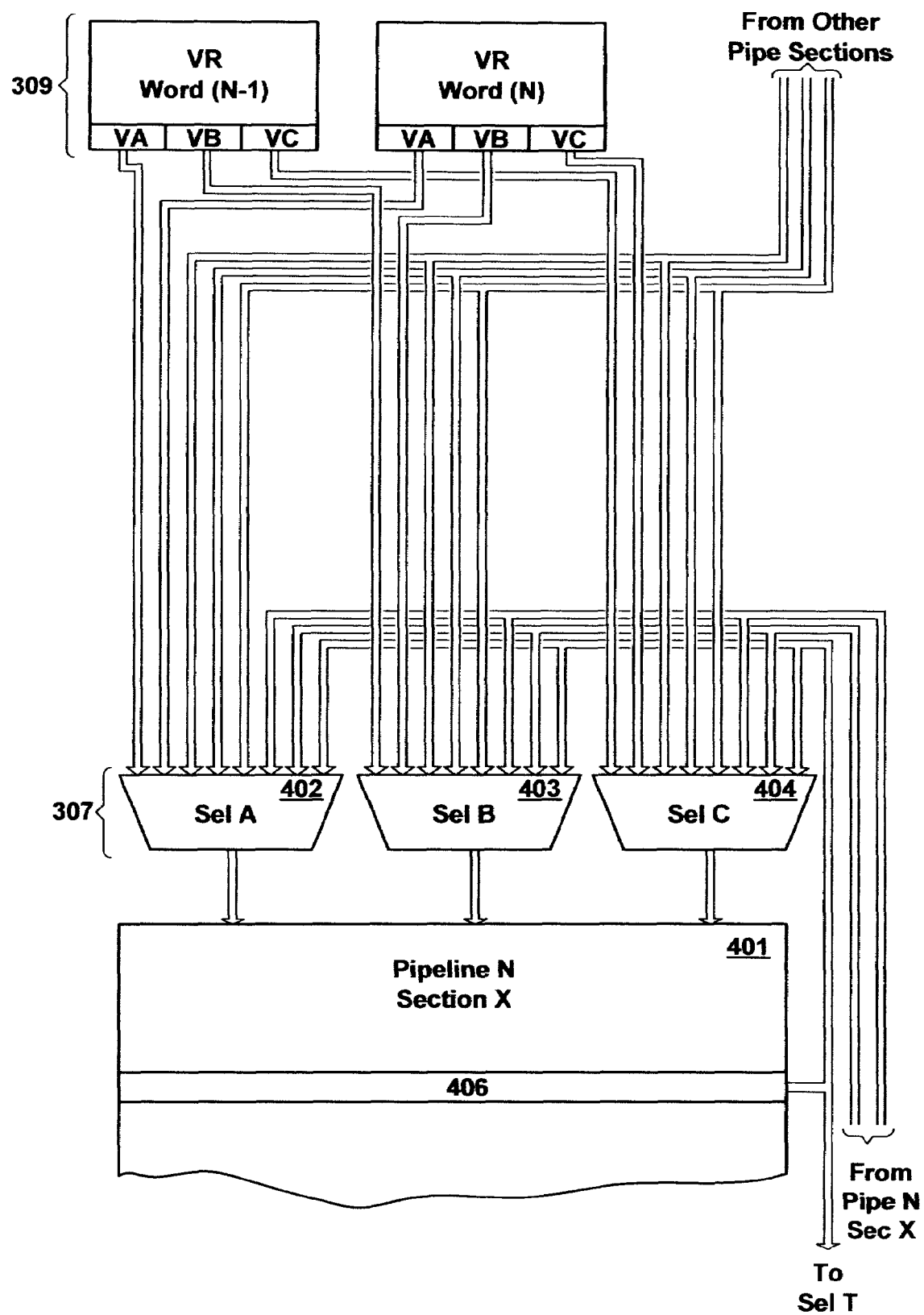
FIGS. 4A and 4B (herein collectively referred to as FIG. 4) are a diagram showing in greater detail selection logic at the input and output of a pipeline for supporting shifting of pipeline data, according to the preferred embodiment.
Figure 4B:
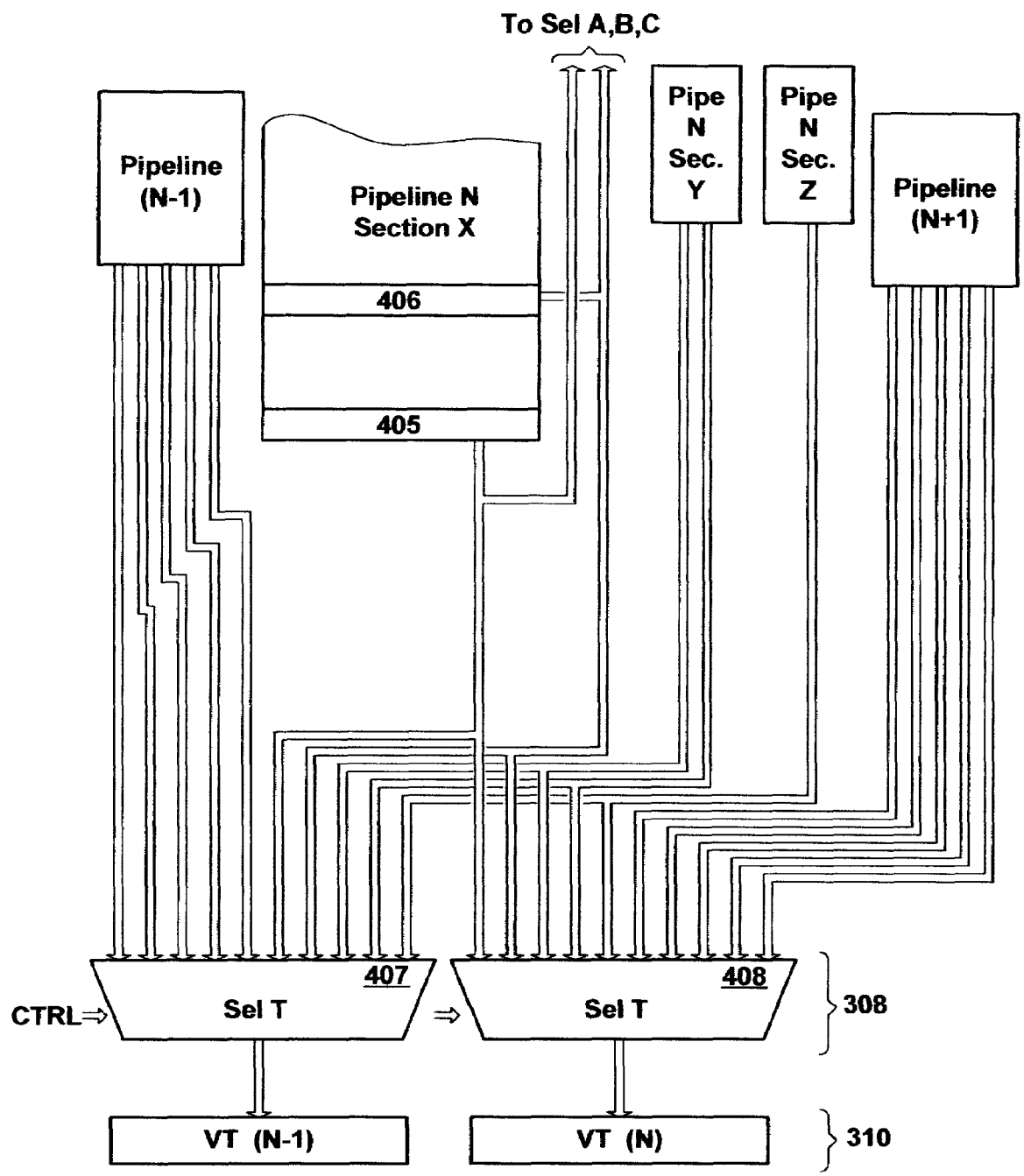

FIGS. 4A and 4B (herein collectively referred to as FIG. 4) show in greater detail the selection logic at the input and output of a pipeline, which supports shifting of pipeline data in the event that one of the pipelines becomes inoperable, according to the preferred embodiment. Pipeline N, X section 401 is a generalized representation of any of pipeline sections 314-325. I.e., Pipeline N, X section is a representation of a section (which could be a permute section, a FX section, or a FP section) of a pipeline corresponding to word N of vector register file 215.

Each pipeline section 401 includes three input selectors 402-404, corresponding to registers VA, VB and VC, respectively, the input selectors being part of selection logic 307 shown in FIG. 3. Although simplified FIG. 3 represents a single set of selection logic for each pipeline 301-305, it will be recalled that in fact each pipeline section 311-325 is a complete pipeline, and each pipeline section can receive input directly from temporary input registers 309 of vector register file 215. Therefore, each pipeline section 311-325 has its own set of input selectors.

A pipeline section can receive input from temporary input registers 309, but it can also receive input from itself or from a different pipeline section within the same pipeline. This input may be from an intermediate stage in a pipeline section, or from the final stage of a pipeline section. For example, FX pipeline section 318 might receive input from permute section 317 or from FP section 319; it might also receive input directly from its own output, or from an intermediate stage within itself. However, FX pipeline section 318 can not receive input directly from any section of pipeline 301, 302, 304 or 305. This input could be received in conjunction with inputs from temporary input registers 309. For example, a given instruction might take the A and C operands (selected by selectors 402 and 404) from the VA and VC temporary input registers, and the B operand (selected by selector 403) from the output of a different pipeline section. The capability to receive input from another pipeline section or from the final or intermediate stage of the same pipeline section by-passes vector register file 215 when performing certain serial operations.

For the generalized Pipeline N section 401 corresponding to word N of vector register file 215, the A operand selector 402 receives input from the VA temporary input register for word N. It also receives input from the VA register for word (N−1). It further receives input from the final stage 406 of Pipeline N section 401. For some pipeline sections, it further receives input from one or more intermediate stages 405 of Pipeline N section 401. Finally, it further receives input from one or more final or intermediate stages of other pipeline sections within the same pipeline, i.e., corresponding to the same word of register file 215, or if Pipeline N section 401 is in the redundant pipeline, then other sections within the redundant pipeline.

The same general description is true of B operand selector 403 and C operand selector 404. The B selector 403 receives, among others, inputs from the VB register for word N and the VB register for word (N−1). The C register receives, among others, inputs from the VC register for word N and the VC register for word (N−1).

Although the number of inputs for each selector 402-404 is shown as identical in FIG. 4, this is not necessarily the case, and some intermediate or final pipeline stages might be used by some selectors and not others. However, in general each selector 402-404 will receive a half dozen or more inputs. It will be observed that if pipeline array 216 contained no redundant pipeline and no data shifting capability, then selector 402 would not receive an input from the VA register for word (N−1), but would still receive all the other inputs, and similarly for selectors 403 and 404. Thus, the selection logic for selection word N or word (N−1) as the input, which is used to shift data to an adjacent pipeline, is integrated into selection logic which already exists. The effect of adding a redundant path selection is that the number of inputs to each of selectors 402-404 is increased by one (e.g., from seven to eight). In general, this amounts to a negligible effect on propagation delay time through the selection logic.

The output selection logic 308 performs the analogous in reverse. A separate selector (of which two 407, 408 are shown) is associated with each VT word register 310. Selector 407 selects the input to destination register VT for word (N−1), which selector 408 select the input to VT for word N. The output of the final stage of Pipeline N section 401 is provided to both selector 407 and 408. Selector 407 also receives the final stage of the corresponding pipeline section for word (N−1), while selector 408 also receives the final stage of the corresponding pipeline section for word (N+1). Since each of the permute, FX and FP pipeline sections in the pipeline for word N has a final stage, each of these final stages is input to selectors 407 and 408. Additionally, one or more intermediate stages may be input to selectors 407 and 408. Thus, in order to support shifting of data from one pipeline to another, the number of inputs to each of selectors 407, 408 is doubled. Selector 407 has a complete set of inputs from the pipeline associated with word (N−1) and from the pipeline associated with word N, while selector 408 has a complete set of inputs from the pipelines associated with word N and word (N+1). Although the number of inputs to each selector is doubled, the selection between one pipeline or the other is still integrated into selection logic which would otherwise be present for selecting outputs from different stages or sections of the same pipeline. The doubling of selector inputs is considered preferable to a separate 2-way selector in series with a selector of pipeline stage outputs, because there is still only one selector gate delay in the critical path.

Figure 5:
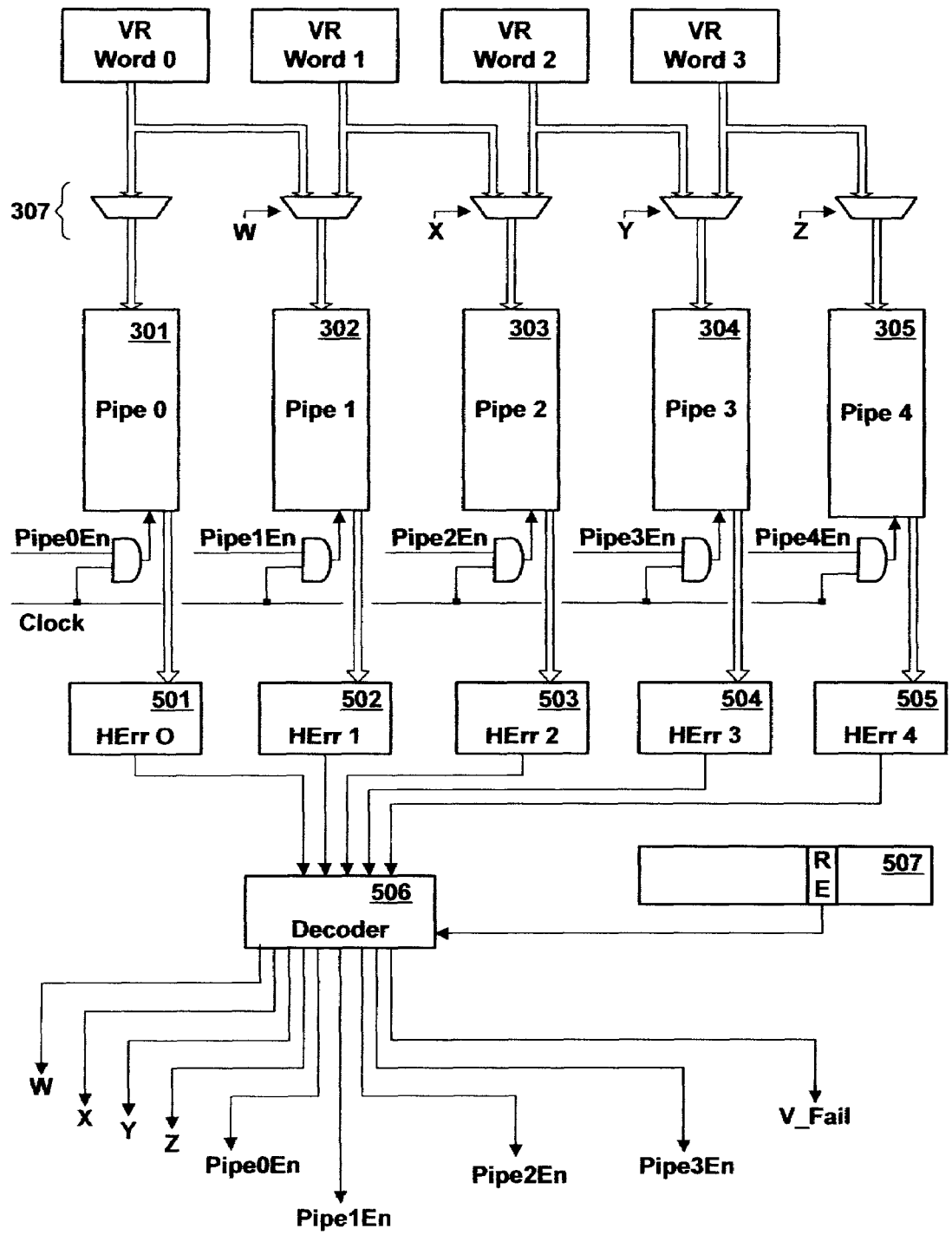
FIG. 5 is a diagram showing the hardware control logic which controls shifting of data to an adjacent pipeline, according to the preferred embodiment.

FIG. 5 illustrates the hardware control logic which controls shifting of data to an adjacent pipeline, according to the preferred embodiment. As shown in FIG. 5, a respective hardware error detection register 501-505 is associated with each pipeline 301-305. Hardware error detection registers 501-505 provide input to decoder 506. Additionally, a special vector/graphics unit control register 507, containing status and control information for vector/graphics unit 214, includes a repair enable bit (RE) which is input to decoder 506. The RE bit is used to enable/disable data shifting in the event of a pipeline failure; a "1" indicates that shifting is enabled. While it is expected that shifting will normally be enabled, in some applications, particularly for purposes of testing, it may be desirable to disable shifting. Decoder 506 uses these various inputs to generate control signals for enabling/disabling clocks to pipelines 301-305, and for controlling selectors 307 and 308.

In the preferred embodiment, each register 501-505 contains a respective hard error bit (designated HF0 through HF4, respectively), indicating whether an unacceptable hard error has been detected in the corresponding pipeline, i.e., the pipeline is considered to be inoperable. Each register 501-505 may additionally include one or more bits used to record soft errors. In the preferred embodiment, error conditions are detected by checking parity of data quantities at various stages of the pipeline. A single isolated parity error may be considered a "soft" error, but if the parity error is repeated after retrying the operation, or if isolated parity errors appear at an unacceptable frequency, the error condition will be considered a "hard" error, meaning that the pipeline is inoperable, and the corresponding hard error bit in one of registers 501-505 will be set.

Other techniques for detecting error conditions may be used in addition to or in place of parity checking. Various such techniques are known in the art, and an error condition may be detected using any of these various techniques, or any technique hereafter developed. For example, special hardware can detect invalid machine states; selective microcode instructions might exercise unused pipeline portions with test data to verify function; low-level system software may run test data through the pipelines during idle machine cycles; etc.

Decoder produces control signals W, X, Y and Z for select logic 307, 308, pipeline enable signals Pipe0En, Pipe1En, Pipe2En, Pipe3En and Pipe4En for enabling the clocks to pipelines 301-305, respectively, and a vector/graphics unit fail (V_Fail) signal. A V_Fail signal is produced if more than one pipeline is recording a hard error, or if one of the primary pipelines is recording a hard error and the repair enable bit is not set. In this case, operation of the graphics unit is considered unreliable. V_Fail is logically produced according to the following equation:

V_Fail=(HF0 AND HF1) OR (HF0 AND HF2) OR (HF0 AND HF3) OR (HF0 AND HF4) OR (HF1 AND HF2) OR (HF1 AND HF3) OR (HF1 AND HF4) OR (HF2 AND HF3) OR (HF2 AND HF4) OR (HF3 AND HF4) OR (HF0 AND <RE>) OR (HF1 AND <RE>) OR (HF2 AND <RE>) OR (HF3 AND <RE>)

Select control signals W, X, Y and Z are generated according to the following equations:

W=HF0 AND <V_Fail> AND RE

X=(HF0 AND <V_Fail> AND RE) OR (HF1 AND <V_Fail> AND RE)

Y=(HF0 AND <V_Fail> AND RE) OR (HF1 AND <V_Fail> AND RE) OR (HF2 AND <V_Fail> AND RE)

Z=(HF0 AND <V_Fail> AND RE) OR (HF1 AND <V_Fail> AND RE) OR (HF2 AND <V_Fail> AND RE) OR (HF3 AND <V_Fail> AND RE)

In other words, if RE is "1" (data shifting is enabled) and V_Fail is "0" (no unrecoverable hard failure has been detected), then each select signal indicates whether any preceding pipeline has failed (and thus should be shifted). Pipeline enable signals are similarly generated:

Pipe0En=<HF0> OR V_Fail OR <RE>

Pipe1En=<HF1> OR V_Fail OR <RE>

Pipe2En=<HF2> OR V_Fail OR <RE>

Pipe3En=<HF3> OR V_Fail OR <RE>

Pipe4En=Z

And thus if a primary pipeline is failing, and the V_Fail is off, and RE is set on (enabling data shifting), the primary pipeline's clock will be disabled while its data is shifted to another pipeline. Disabling the clock reduces power consumption in the primary pipeline.

Although the decoder is described in terms of logic functions it implements, it will be understood that an actual circuit implementation may use optimizations which are not a direct translation of the equations above.

As explained above with respect to FIG. 4, select logic 307, 308 in fact is integrated with select logic for selecting among various other inputs and outputs to produce N-way selects, where N is greater than 2. Select control signals W, X, Y and Z are therefore only some of the control signals for the N-way selects, the remaining signals being generated according to the operations being performed by the pipelines.

In operation, the vector/graphics unit pipelines are continually or periodically monitored using any technique as described, and a hard error in one of the pipelines is recorded in the corresponding hard error detection register. If conditions for data shifting are met, the pipelines are flushed, the pipeline in which the error was detected is disabled, the redundant pipeline is enabled, and the selection logic is set to shift data to by-pass the failing pipeline. The pipelines are then restarted. These operations may be accomplished entirely in hardware, without intervention by the operating system.

Figure 6:
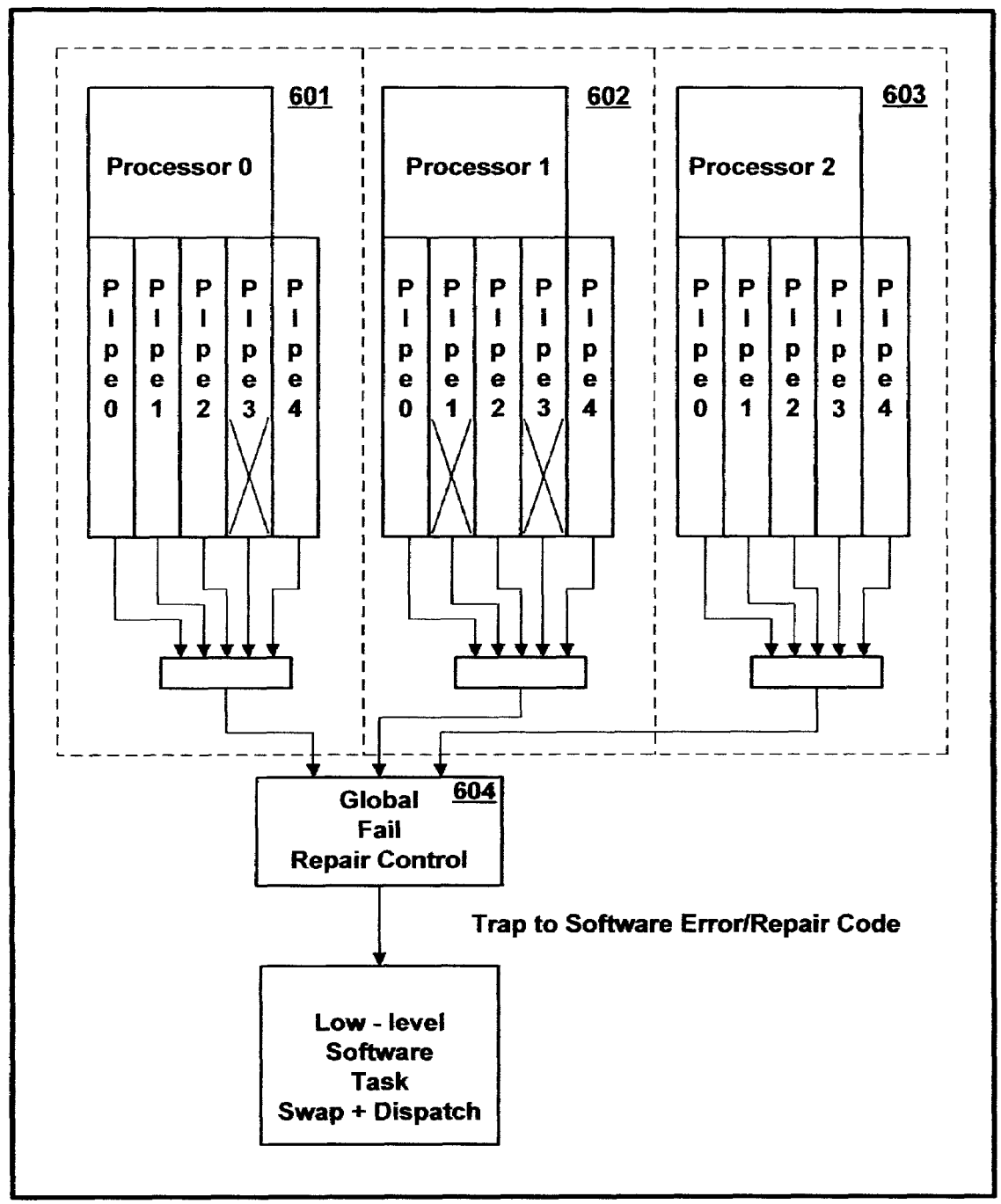
FIG. 6 illustrates a system environment supporting selective thread execution in the event that more than one pipeline in a processor becomes disabled, according to a preferred system environment.

The action taken by the system in response to a V_Fail signal may vary. In a preferred system environment, it is be possible to assign all execution threads containing any vector/graphics unit instructions to different processors, so that the processor which generated the V_Fail signal continues to operate, but processes only execution threads without any vector/graphics instructions. FIG. 6 illustrates a such a system environment. As shown in FIG. 6, three processors 601-603 each contain a set of primary pipelines and a single redundant pipeline. The V_Fail signals produced by each decoder are provided to global fail repair control logic 604, which may be in a separate processing unit such as a service processor.

In processor 601, Pipe3 is disabled, and redundant pipeline Pipe4 has taken over its operation. Processor 601 otherwise continues to execute normally. In processor 603, both Pipe1 and Pipe3 are disabled, causing the V_Fail signal for processor 602 to be activated. As a result, global fail repair control logic generates a trap to low-level software error repair code. The software error repair code causes any tasks having vector/graphics instructions (using the vector/graphics pipelines) to be swapped out of processor 602. Processor 602 continues to execute threads which contain no such instructions.

As a further alternative, it would be possible to continue to operate processor 602 using only the available pipelines, by serializing pipeline operations. In the example of FIG. 6, the data for Pipe0 and Pipe1 could be loaded to Word 0 and Word 2 of the vector register, followed by loading the data for Pipe2 and Pipe3 to Word 0 and Word 2 of the vector register. Each vector/graphics instruction would therefore require additional time to complete, but the processor would be capable of executing such instructions. Additional control hardware and/or software would be necessary to support this mode of operation.

In other multi-processor architectures, it may be necessary to disable the processor which generated the V_Fail signal. If the system contains only one processor, a V_Fail signal may cause system failure.

As described above, a single redundant pipeline is provided for an array of primary pipelines within a single processor. In the case of a processor having four primary pipelines, a fifth redundant pipeline is provided in hardware, a pipeline hardware increase of 25%. Although only the pipeline is redundant, and it would not necessarily mean an increase of 25% in the total number of circuits in a processor, there is still a significant hardware cost. This cost can be reduced if the redundancy is shared among more than one processor. As chip sizes and circuit densities have increased, it is becoming feasible to put multiple processors (referred to as "processor cores") on a single chip. Each processor core has its own instruction unit, and thus each processor core processes independent threads of execution.

Figure 7:
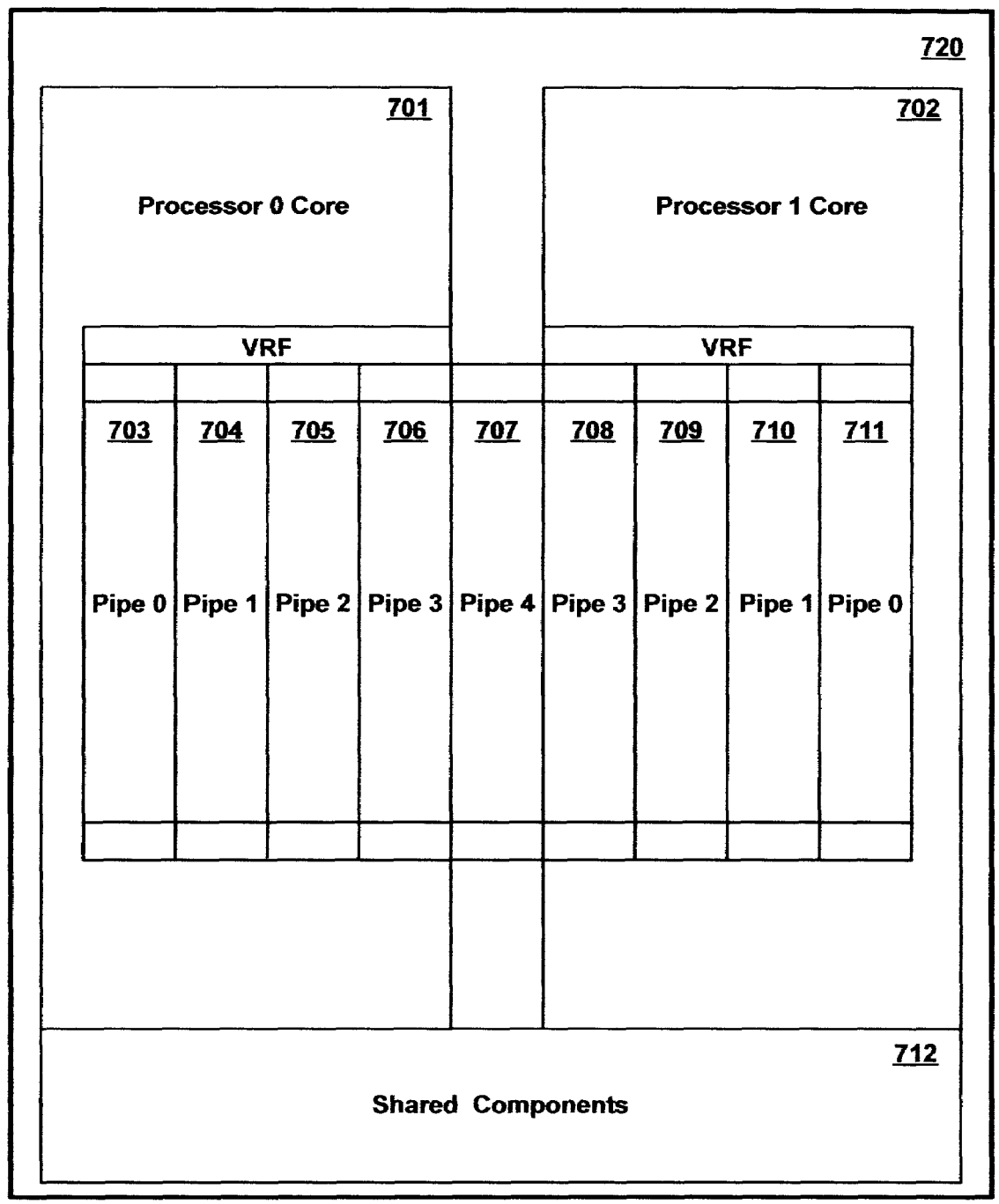
FIG. 7 is a high-level diagram of an integrated circuit chip having multiple processor cores and a shared redundant pipeline, according to an alternative embodiment of the present invention.

FIG. 7 is a high-level diagram of an integrated circuit chip having multiple processor cores and a shared redundant pipeline, according to an alternative embodiment of the present invention. Referring to FIG. 7, a single integrated circuit chip 720 includes two processor cores 701, 702. Each processor core contains its own instruction unit and execution unit, capable of processing threads of execution independently of the other processor core on chip 720. Processors 701 and 702 may share some components 712, such as an L2 Cache.

Processor 701 includes vector/graphics primary pipelines 703-706, while processor 702 includes vector/graphics primary pipelines 708-711. The physical arrangement of pipelines is approximately as shown, although the pipelines are not necessarily drawn to scale. Redundant pipeline 707 is located along the junction of the two processor cores, and adjacent Pipe3 706 of processor 701 and Pipe3 708 of processor 702. In normal operation, redundant pipeline 707 is not used. In the event of a failure of any pipeline in either processor core, data from that processor is shifted into redundant pipeline 707, as described above in the case of a single processor. An additional pair of control signals (not shown) running between the processor cores is added to assure that the other processor is not already using the redundant pipeline.

In the preferred embodiment, the processor contains multiple primary pipelines and a single redundant pipeline. However, in an alternative embodiment, the processor might contain only a single primary pipeline. This embodiment is possibly less attractive where the redundant pipeline is not shared, and hence a doubling of pipeline capacity is required for redundancy. But if, as in the alternative embodiment of FIG. 7, a redundant pipeline is shared among multiple processor cores on a single chip, the added cost of the redundant pipeline is spread among multiple processors, reducing the cost per processor. For example, a single chip might contain two processor cores, each having a single dedicated pipeline, and a third pipeline which is redundant, and could be used by either processor core in the event that the pipeline normally assigned to that processor core becomes inoperative.

In the preferred embodiment described above, redundancy has been applied to multiple parallel pipelines of a vector/graphics subunit of a processor. However, it will be understood that a redundant pipeline associated with a set of parallel pipelines could be used in other contexts. Specifically, a processor in accordance with the present invention need not have a vector/graphics subunit, and may implement a set of parallel pipelines as part of the main execution unit. Furthermore, parallel pipelines might be contained within other units and perform other functions. For example, an instruction unit might have a set of parallel instruction fetch and decode pipelines for supporting multiple execution threads or for supporting multiple branch conditions. Furthermore, although in the preferred embodiment, an entire redundant pipeline, including a redundant permute section, a redundant FX section, and a redundant FP section, are provided, it will be understood that redundancy might be applied to some smaller portion of the hardware. For example, it is possible that only the FX section or the FP section will be redundant.

In the preferred embodiment, a single pipeline is designated a redundant pipeline while other pipelines are primary pipelines, and are used by default. In the absence of a pipeline failure, the redundant pipeline is idle. In an alternative embodiment, it would be possible to rotate the idled pipeline in a round robin fashion in the absence of a pipeline failure, so that no single pipeline is always idle. By rotating the idled pipeline, each pipeline is used only 80% of the time. This reduces the average power consumption in the primary pipelines, and may allow the pipelines to operate at a lower temperature. Rotation would be performed on a periodic basis, e.g., approximately every millisecond, or after some pipelined instruction count is reached. Rotation would require that the pipelines be flushed, thus losing a few clock cycles of execution, but if it is performed approximately every millisecond, the effect on performance would be negligible.

In the preferred embodiment, a single redundant pipeline is provided, but it would alternatively be possible to provide multiple redundant pipelines, which may be part of a single processor, or shared by more than one processor as shown in FIG. 7.

Although a specific embodiment of the invention has been disclosed along with certain alternatives, it will be recognized by those skilled in the art that additional variations in form and detail may be made within the scope of the following claims:

What is claimed is:

1. A digital data processing apparatus, comprising:
a plurality of processors, each said processor comprising a respective instruction unit for supporting execution of at least one respective thread of processor-executable instructions independently of threads being executed by any other processor of said plurality of processors;
a plurality of parallel pipelines, each pipeline of said plurality of parallel pipelines having the capability to perform a set of pre-defined functions on respective input data, said plurality of pipelines including at least one redundant pipeline, said at least one redundant pipeline being shared by each said processor of said plurality of processors; and
control logic controlling the routing of data to said plurality of parallel pipelines, wherein said control logic, responsive to detection of a failure of a first pipeline of said plurality of parallel pipelines, causes data intended for processing by said first pipeline to be processed by a said redundant pipeline;
wherein said plurality of parallel pipelines comprises a plurality of discrete pipeline subsets, including (a) a respective discrete pipeline subset associated with each said processor of said plurality of processors, each respective discrete pipeline subset associated with a processor containing at least one said pipeline, each said pipeline of a respective subset processing data on behalf of the processor with which it is associated; and (b) a discrete pipeline subset containing at least one redundant pipeline; and,
wherein said plurality of parallel pipelines are arranged in an array physically adjacent one another, wherein each said redundant pipeline is located in said array between a respective pair of said discrete pipeline subsets each associated with a respective processor.

2. The digital data processing apparatus of claim 1, wherein each said respective discrete pipeline subset associated with a processor contains N pipelines, where N is greater than 1.

3. The digital data processing apparatus of claim 1, wherein said plurality of parallel pipelines comprises N primary pipelines and a single redundant pipeline, said redundant pipeline providing redundant function in the event of failure of any single one of said N primary pipelines, where N is greater than 1.

4. The digital data processing apparatus of claim 1, wherein said control logic comprises selection logic at one or more inputs to each respective pipeline, said selection logic controlling the selection between a primary source and a secondary source of pipeline data for the respective pipeline.

5. The digital data processing apparatus of claim 4, wherein said selection logic is integrated with operand source selection logic for one or more stages of the respective pipeline.

6. The digital data processing apparatus of claim 1, wherein said plurality of parallel pipelines perform arithmetic operations on floating point data.

7. The digital data processing apparatus of claim 6, wherein said plurality of parallel pipelines perform arithmetic operations on mixed data, including floating point data and fixed point data.

8. The digital data processing apparatus of claim 1, wherein said digital data processing apparatus is embodied in a single integrated circuit chip.

9. The digital data processing apparatus of claim 1, further comprising:
 a memory storing instructions for execution on said plurality of processors; and
 at least one bus coupling said plurality of processors to said memory.

* * * * *